United States Patent [19]
Whitlock et al.

[11] Patent Number: 5,545,242
[45] Date of Patent: Aug. 13, 1996

[54] IN-LINE FILTER FOR TUBING

[75] Inventors: Michael Whitlock, Cortland; William Murphy, Homer, both of N.Y.

[73] Assignee: Pall Corporation, East Hills, N.Y.

[21] Appl. No.: 277,071

[22] Filed: Jul. 19, 1994

[51] Int. Cl.[6] .................... B01D 35/02; B01D 46/10
[52] U.S. Cl. .................... 55/502; 55/503; 55/507; 55/510; 55/511; 210/435; 210/446; 210/454
[58] Field of Search ............... 55/503, 502, 510, 55/511, 507, 504, 505; 210/435, 446, 454

[56] References Cited

U.S. PATENT DOCUMENTS

| | | | |
|---|---|---|---|
| 1,020,782 | 3/1912 | Tinker | 55/503 |
| 3,422,679 | 1/1969 | McGowan et al. | 55/502 |
| 3,493,115 | 2/1970 | Koches | 55/503 |
| 3,715,870 | 2/1973 | Guzick | 55/502 |
| 4,263,140 | 4/1981 | Wujnovich et al. | 210/247 |
| 4,303,426 | 12/1981 | Battis | 55/502 |
| 4,367,081 | 1/1983 | Harvey | 55/503 |
| 4,493,717 | 1/1985 | Berger, Jr. et al. | 55/503 |
| 4,523,937 | 6/1985 | Brubaker | 55/509 |
| 4,657,570 | 4/1987 | Gronholz et al. | 55/511 |
| 4,671,873 | 6/1987 | Keller | 55/502 |
| 5,141,637 | 8/1992 | Reed et al. | 55/502 |
| 5,222,747 | 6/1993 | McGarvey | 277/236 |

FOREIGN PATENT DOCUMENTS

| | | | |
|---|---|---|---|
| 2093894 | 1/1972 | France. | |
| 1955437 | 2/1967 | Germany. | |
| 1586744 | 8/1990 | U.S.S.R. | 55/503 |

OTHER PUBLICATIONS

Pall, Selection Guide Ultramet-L™ Gaskleen Filter Assembly, Assembly Data Sheet A9a, Copyright 1990, Pall Corp., 2 pages.

Primary Examiner—Jay H. Woo
Assistant Examiner—Duane S. Smith
Attorney, Agent, or Firm—Leydig, Voit & Mayer

[57] ABSTRACT

An in-line filter includes a filter element sandwiched between two gaskets. A sealing portion is disposed between the gaskets to forming a seal around a periphery of the filter element. The filter can be disposed inside a standard type of tubing connector, and a seal can be formed between the gaskets and opposing sealing surfaces of the tubing connector. The gaskets may directly contact the sealing surfaces of the tubing connector, or sealing members may be disposed between the gaskets and the sealing surfaces.

22 Claims, 2 Drawing Sheets

IN-LINE FILTER FOR TUBING

BACKGROUND OF THE INVENTION

1. Field of the Invention

This invention relates to an in-line filter. More particularly, it relates to an in-line filter which can be used with standard types of tubing connectors designed for tubing carrying gases used in the manufacture of semiconductors.

2. Description of the Related Art

Various gases are employed in the manufacture of semiconductors. Because particulate matter in the gases can introduce flaws into the semiconductors being manufactured, it is important that the gases be of extremely high cleanliness. Therefore, it is common to install in-line particulate filters along tubing lines for carrying these gases. An in-line filter refers to a filter which has a straight-line flow path (the inlet, the filter element, and the outlet of the filter being substantially coaxial) and which is easily installed in a tubing line.

A conventional in-line filter for use with tubing lines includes a metallic housing having a tubular body with threaded connections at opposite ends and a filter element welded to the inside of the housing. In use, the housing is placed between two sections of tubing which are to be joined, each section of tubing having one half of a standard tubing connector installed on its end. The threaded connections of the housing are then sealingly connected to the two halves of the tubing connector to form a threaded joint.

An in-line filter of this type has a number of drawbacks. One is that it increases the length of the tubing line by the length of the housing, so in some cases, it is difficult or impossible to retrofit an existing tubing line with such a filter. Furthermore, because a connection is formed at each end of the housing, the number of connections in the tubing line is greater than in the absence of the in-line filter, so the number of possible sources of contamination or leakage increases. In addition, since the filter element is welded inside the housing, it is impossible to inspect the filter element without damaging the housing or the filter element.

SUMMARY OF THE INVENTION

Accordingly, it is an object of the present invention to provide an in-line filter which is extremely compact and produces virtually no increase in the length of a tubing line in which it is installed.

It is another object of the present invention to provide an in-line filter which can be employed with a variety of types of standard tubing connectors.

It is a further object of the present invention to provide an in-line filter which is simple to install in and remove from a tubing line.

It is yet another object of the present invention to provide an in-line filter which is economical to manufacture.

It is a still further object of the present invention to provide a tubing connector assembly employing a filter according to the present invention.

It is also an object of the present invention to provide a method for manufacturing an in-line filter.

An in-line filter according to the present invention includes first and second gaskets and a filter element sandwiched between the gaskets. A sealing portion is disposed between the gaskets and forms a seal around a periphery of the filter element. In preferred embodiments of an in-line filter suitable for use with semiconductor-grade gases, the gaskets as well as the filter element are metallic, and the sealing portion is a metal-to-metal seal, such as a weld extending between the gaskets.

A tubing connector assembly according to the present invention includes a tubing connector and a filter disposed within and detachably sealed to the tubing connector. The filter includes first and second gaskets, a filter element sandwiched between the gaskets, and a sealing portion disposed between the gaskets and forming a seal around a periphery of the filter element.

A method of manufacturing an in-line filter according to the present invention includes the steps of sandwiching a filter element between first and second gaskets, and forming a seal around a periphery of the filter element and between the gaskets.

An in-line filter according to the present invention can be installed inside a tubing connector, so it produces very little increase in the length of the tubing line in which it is installed. Therefore, it can be installed with a minimum of labor and can be easily applied to existing tubing lines. Furthermore, the filter can be readily inspected simply by partly disassembling the tubing connector in which it is installed.

DESCRIPTION OF PREFERRED EMBODIMENTS

A number of preferred embodiments of an in-line filter according to the present invention will now be described with reference to the accompanying drawings. The embodiments to be described are intended for use in the filtration of gases, and particularly for the filtration of gases used in the manufacture of semiconductors. However, the present invention can be employed for filtering other types of gases and for filtering fluids other than gases.

Figure 1:
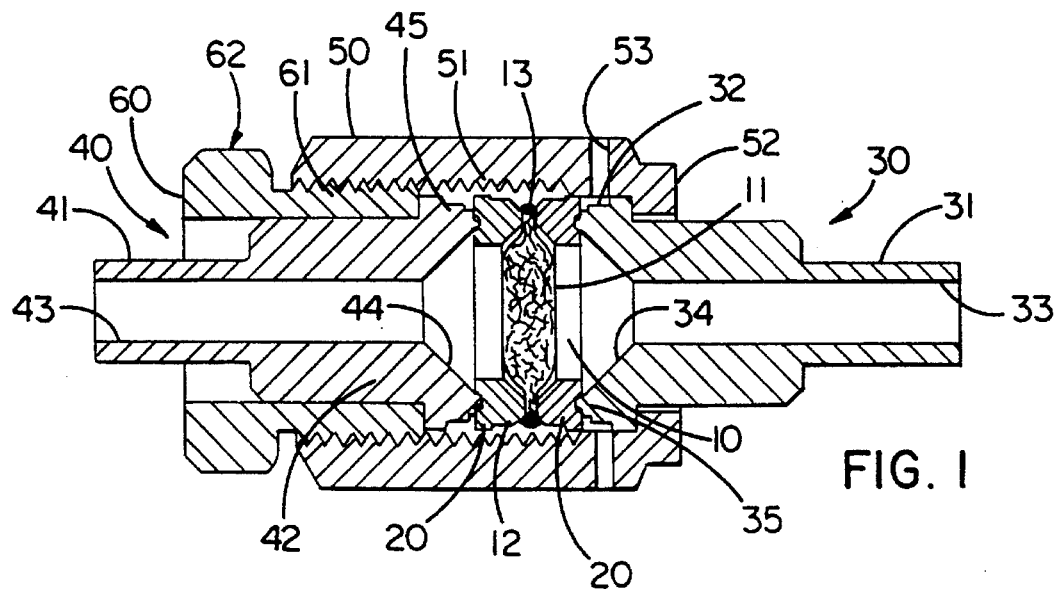
FIG. 1 is a longitudinal cross-sectional view of an embodiment of a filter according to the present invention installed in a standard variety of tubing connector.

FIG. 1 is a longitudinal cross-sectional view of one embodiment of a filter 10 of the present invention installed inside a standard variety of tubing connector. The filter 10 includes a filter element 11 sandwiched between supports in the form of a pair of annular gaskets 20 which are sealingly connected to the filter element 11 by a sealing portion in the form of a weld 13 extending between the gaskets 20 and around the entire periphery of the filter 11 to form a fluid-tight seal.

The filter element 11 shown in FIG. 1 is generally disk-shaped with a circular outer periphery, due primarily to the shape constraints imposed by the interior shape of the tubing connector. However, the shape is not critical, and the filter element 11 can instead be cylindrical, bag-shaped, or conical, for example, and it need not have a circular periphery. Preferably, the filter element 11 does not extend past the outer lateral surfaces of the gaskets 20 (the surfaces contacting the tubing connector) so that the filter 10 can be readily installed in and removed from the tubing connector without deforming or otherwise damaging the filter element 11. In other words, the filter element 11 is preferably disposed entirely between opposing imaginary planes contacting the outer lateral surfaces. The surface of the filter element 11 of FIG. 1 is substantially smooth on a macroscopic scale, but it is possible for it to be formed with ridges or corrugations to increase the surface area. The structure and pore size of the filter element 11 can be chosen in accordance with the materials which are to be filtered, the maximum operating temperature, and the desired flow characteristics through the filter element 11. When the filter element 11 is used for filtering gases used in semiconductor manufacture, it is preferably made of a low outgassing, bakeable, and corrosion resistant material, such as stainless steel, nickel, or a Hastelloy metal.

Some examples of a suitable metal filter medium for use in filtering a high purity semiconductor grade gas are (a) a depth type filter medium comprised of very fine, short metal fibers sintered together at their points of contact, such as that sold by Pall Corporation under the trademark PMF, (b) a sintered woven wire mesh such as that sold by Pall Corporation under the trademark Rigimesh, (c) a woven wire mesh having sintered metal powder within the pores of the mesh, such as that sold by Pall Corporation under the trademark PMM, (d) a composite including more than one type of material, such as a depth type filter medium sandwiched between and bisintered to two layers of coarse woven wire mesh which provide support to the upstream and downstream sides of the depth type filter medium but perform substantially no filtering function. Any of these filter media can be formed of a corrosion resistant metal such as stainless steel or Hastelloy. A non-metallic filter element 11 made of a polymer or a ceramic, for example, can also be employed provided that fluid compatibility and operating conditions are appropriate.

The filter element 11 can be constructed to have specified upstream and downstream surfaces, or it can constructed such that either surface can be employed as an upstream or downstream surface. If flow through the filter element 11 is primarily in one direction and there is little possibility of reverse pressure surges, it may be desirable to have an asymmetric structure, such as a structure having a woven wire mesh support layer on the downstream side of a sintered metal fiber medium and having no support layer or a lighter support layer on the upstream side.

The gaskets 20 in this embodiment are annular disks having the form of bodies of revolution about a longitudinal axis, with circular inner and outer peripheries. However, as long as the lateral surfaces of each gasket 20 can achieve sealing contact with a tubing connector around the entire periphery of the gasket 20, the peripheral shape of the gaskets 20 is not critical. For example, instead of being circular, the gaskets 20 can have polygonal peripheries.

Each gasket 20 has a single central hole for the passage of the fluid being filtered. Alternatively, the single hole can be replaced with a plurality of smaller holes which permit the passage of fluid while enabling the sides of the gaskets between the holes to provide lateral support to the filter element 11.

The gaskets 20 can be made of any material which is compatible with the fluid being filtered and which can be sealingly connected to the filter element 11. When the filter 10 is used to filter gases for semiconductor manufacture, the gaskets 20 are preferably made of a corrosion resistant metal, some examples of which are stainless steels such as 316L stainless steel and nickel alloys such as Hastelloy (a trademark of Cabot Corporation for a high-strength, nickel-base, corrosion-resistant alloy). In other applications, when fluid compatibility and operating conditions are appropriate, different materials can be used for the gaskets 20, such as polymers, elastomers, or ceramics.

When the gaskets 20 are made of metal, it may be desirable to anneal the metal to improve its ability to seal against the interior surfaces of a tubing connector. When fully annealed, the surfaces of the gaskets 20 can deform somewhat to fill small surface irregularities in the interior surfaces of the connector.

The exterior surface of the gaskets 20 may be coated with a suitable material to give the surface desired properties. For example, when the gaskets 20 are made of stainless steel, they can be coated with silver or nickel to increase sealability on rougher surfaces. Other examples of possible coating materials are Teflon, silicones, and molybdenum-containing anti-gall coatings.

The filter element 11 can be joined to the gaskets 20 by any suitable method able to form a seal of high integrity between the filter element 11 and the gaskets 20. When the gaskets 20 and the filter element 11 are both formed from metal, it is convenient to join the two by a welding method such as laser welding, TIG (GTAW) welding, or electron beam welding to form a weld 13 extending between the gaskets 20 and around the entire periphery of the filter element 11. In the present embodiment, the gaskets 20 are welded to each other as well as to the filter element 11 so that the weld 13 serves not only to prevent fluid from escaping from between the gaskets 20 but also prevents unfiltered fluid from bypassing the filter element 11. However, as long as the seal created by the weld 13 has the desired integrity and strength, it can be formed between the gaskets 20 only, or between the filter element 11 and the gaskets 20 without directly connecting the gaskets 20 to each other. Depending upon the materials of which the filter element 11 and the gaskets 20 are formed, it may instead be preferable to join the gaskets 20 and the filter element 11 by a method such as soldering or brazing. When the gaskets 20 and the filter element 11 are made of a non-metal such as a polymeric material, they can be joined by conventional methods such as bonding or thermal welding.

When the filter element 11 is formed of a highly porous material with fine metal fibers, it may be difficult to weld in the as-manufactured state. In this case, it may be desirable to compress the filter element 11, e.g., crush the filter element 11 around its periphery 12 before welding the filter element 11 to the gaskets 20, as shown in FIG. 1. The increased density of the compressed periphery 12 greatly improves weldability of the filter element 11 and can also increase the axial stiffness of the resulting filter 10.

The filter 10 may include other elements besides the filter element 11 and the gaskets 20. For example, if the filter element 11 is particularly delicate, a porous reinforcing member, such as a metal grid, may be secured inside the bore of one of the gaskets 20 on one or both surfaces of the filter element 11.

A filter according to the present invention can be used with a variety of types of standard tubing connectors. The filter 10 of FIG. 1 is shown installed in a standard tubing connector of the type referred to as a VCR connector. This connector comprises first and second sections 30 and 40 held together by a female nut 50 engaged with a male nut 60. The first section 30 comprises a tubular portion 31 to which unillustrated tubing can be attached and an enlarged head portion 32 integrally formed on one end of the tubular portion 31. A cylindrical bore 33 runs through the center of the first section 30 over its entire length. The second section 40 of the connector likewise has a tubular portion 41 and an enlarged head portion 42 integrally formed on one end of the tubular portion 41. A cylindrical bore 43 is formed through the center of the second section 40 over its entire length. When the first and second sections 30 and 40 are joined together, the two central bores 33 and 43 are coaxially disposed. The inner diameters of the central bores 33 and 43 will depend on the inner diameter of the tubing with which the tubing connector is to be employed. For example, in a tubing connector for use with tubing have a nominal outer diameter of ½ inch, the central bores 33 and 43 have an inner diameter of approximately 10.3 mm (approximately 0.406 inches).

Each head portion 32 and 42 has a conical chamfered surface 34 and 44 extending outwards from the central bore 33 and 43 of the section. In a VCR connector, both chamfered surfaces 34 and 44 are usually sloped by the same angle with respect to the axial centerline of the connector. The chamfered surfaces 34 and 44 are not necessary for the purpose of obtaining a seal between the filter and the connector sections. Therefore, the filter 10 of FIG. 1 can be installed in a connector not having chamfered surfaces, such as a connector in which the end surfaces of the connector sections meet the central bores at right angles.

On the outer radial periphery of each chamfered surface 34 and 44 is an annular projection 35 and 45 which functions as a sealing surface for sealing against a corresponding one of the gaskets 20.

The sealing surfaces of the connector sections 30 and 40 are pressed into sealing contact with the gaskets 20 of the filter 10 by means of the female and male nuts 50 and 60. These nuts are hollow, tubular members which surround the head portions of the first and second connector sections. The female nut 50 is shaped to fit over the first connector section 30. It has internal threads 51 and an end wall 52 having a through hole through which the tubular portion 31 of the first section 30 can pass. When the nuts 50 and 60 are tightened, the end wall 52 is brought into abutment with the head portion 32 of the first connector section 30. In some instances, a ball bearing or other anti-twist member may be installed inside the female nut 50 between the end wall 51 and the head portion 32 of the first section 30 to prevent torque from being transmitted from the female nut 50 to the tubing attached to the first section 30. One or more venting holes 53 are formed in the female nut 50 between its inner and outer surfaces. The venting holes 53 prevent entrapment of gases that may have leaked past the gaskets 20, they prevent the threads of the tubing connector from acting as a secondary seal, and they provide a convenient means of performing a He leak test. The male nut 60, which is shaped to slide over the second connector section 40, has external threads 61 for engagement with the internal threads 51 of the female nut 50 and a hex portion 62 adjoining the threads 61 to assist a user in assembling the nuts. The right end in FIG. 1 of the male nut 60 abuts against the head portion 42 of the second connector section 40 to urge the second section 40 towards the first section 30 when the nuts are tightened.

A conventional VCR tubing connector is sealed by means of a thin gasket (approximately 0.030 inches thick) disposed between the two connector sections 30 and 40. The filter 10 in the embodiment of FIG. 1 is generally somewhat thicker than this, so the female nut 50 of FIG. 1 is preferably slightly longer than the female nut of an off-the-shelf VCR tubing connector to guarantee adequate thread engagement with the male nut 40 to provide the desired strength. The tubing connector can be otherwise identical to an off-the-shelf VCR tubing connector.

Other means can be used to connect the first and second sections 30 and 40 to one another, such as welding or a bolted flange. Preferably, however, the sections 30 and 40 can be readily disassembled to permit replacement or inspection of the filter 11.

Figure 2:
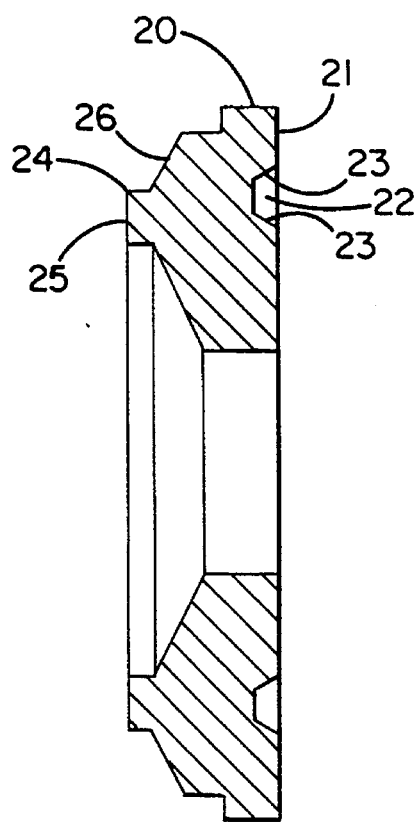
FIG. 2 is an enlarged view of one of the gaskets of the filter of FIG. 1.

FIG. 2 illustrates one of the gaskets 20 of the filter 10 in greater detail. The other unillustrated gasket is identical in structure to this gasket 20. It has an outer lateral surface 21 (the right hand surface in FIG. 2) which seals against the sealing surface of the one of the head portions, and an inner lateral surface 24 (the left hand surface in FIG. 2) which is sealingly connected to the filter element 11. The outer lateral surface 21 may be completely planar, but in order to make it easier to center the filter 10 with respect to a tubing connector, surface 21 in this embodiment it is formed with an annular groove 22 for sealingly engaging the projection 35 or 45 of one of the connector sections 30 or 40. VCR-compatible gaskets having an annular sealing groove are well known, and the shape of the groove 22 can be the same as that used in known gaskets. Generally, the groove 22 has a flat bottom and opposing sloping sides 23, and each projection 35, 45 sealingly contacts one or both of the sloping sides 23. Usually, the projections 35, 45 are not intended to seal against the bottom surfaces of the grooves 22, but this is also possible.

Means other than grooves 22 can be used to help locate the gaskets 20 with respect to the projections 35 and 45 of the connector sections. For example, guide members such as one or more projections can be formed on the outer lateral surfaces 21 of the gaskets 20 radially inwards or outwards of the portions of these surfaces 21 which are to be contacted by the projections 35 or 45 of the tubing connectors.

Figure 3:
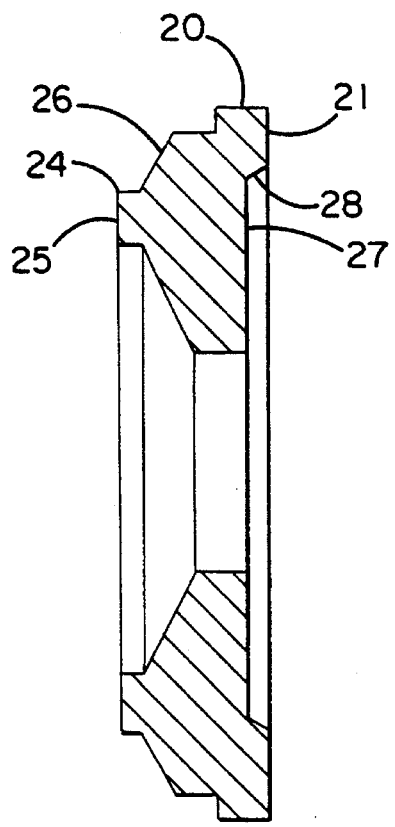
FIG. 3 is an enlarged view of a variation on the gasket of FIG. 2.

The outer surface of each gasket 20 may in fact have any shape which enables the gasket 20 to seal against the projections 35, 45 of the connector sections 30 and 40. FIG. 3 illustrates a variation of the gasket 20 of FIG. 2 in which the annular groove 22 of FIG. 2 is replaced by a step 27 having a sloping side 28 along its outer periphery only. When installed in a VCR connector, the sloping side 28 sealingly engages one of the projections 35 and 45 of the connector sections 30 and 40. Alternatively, the outer face of the gasket 20 may have a shape compatible with a Cajon S-type VCR connector sold by the Cajon Company of Macedonia, Ohio, in which the gasket has a sloping surface and a flat surface along its outer periphery which seal against a corresponding sloping surface and flat surface on the end of a connector section.

The inner lateral surface 24 of the gasket 20 includes a planar portion 25 which is pressed against the outer periphery 12 of the filter element 11. The inner lateral surface 24 may be formed with a chamfer 26 extending from the radial outer edge of the planar portion 25 to provide a region in which a weld 13 can be formed. The inner diameter of the illustrated gasket 20 increases from the outer lateral surface 21 to the inner lateral surface 24 to provide space for the filter element 11, but it is possible for the inner diameter to remain constant or to vary in a different manner between the lateral surfaces 21 and 24.

The filter of FIG. 1 is mounted in the same location as the flat sealing gasket in a conventional VCR. The sealing pressure between the projections 35 and 45 of the connector sections 30 and 40 and the outer lateral surfaces 21 of the gaskets 20 can be the same as the pressure conventionally employed to seal the connector sections 30 and 40 against a metal gasket in a VCR connector.

The filter of FIG. 1 has a number of significant advantages over a conventional in-line filter with a housing. The gaskets 20 have a simple shape and can be manufactured less expensively than a thin-walled housing.

In addition, the entire filter 10 of FIG. 1 is only slightly thicker than a conventional sealing gasket for a VCR connector. Therefore, the overall length of a tubing connector equipped with the filter 10 of FIG. 1 is only slightly greater than that of a VCR connector employing a sealing gasket, so the filter 10 can be installed in many tubing systems in which there is insufficient room for a conventional in-line filter having a housing.

Furthermore, the number of sealing locations between the tubing connector and the gaskets 20 of the filter 10 is the same as for a VCR connector employing a single sealing gasket, so there is no increase in the number of possible leak points. In contrast, a conventional in-line filter having a housing introduces an additional sealing location where one end of the housing is connected to one of the sections of the tubing connector. Therefore, the possibility of leaks is reduced by half with a filter according to the present invention.

Also, the filter 10 can be easily inspected or replaced simply by disengaging the nuts 50 and 60 from each other and drawing the female nut 50 backwards (away from the male nut 6) far enough to expose the filter 10. The filter 10 can then be withdrawn by hand in the radial direction of the tubing connector. In contrast, the filter element of a conventional in-line filter having a housing can be inspected only by cutting open the housing, thereby destroying the housing and potentially damaging the filter element.

In order to enable the projections 35 and 45 to disengage from the grooves 22 in the gaskets 20, it may be necessary to urge the connector sections 30 and 40 slightly away from each other when removing the filter 10. However, generally no more than a few thousandths of an inch of movement are necessary, and motion of this order is usually possible even when the outer ends of the connector sections 30 and 40 are connected to rigid tubing lines. Therefore, virtually zero clearance is required to install and remove the filter 10.

Figure 4:
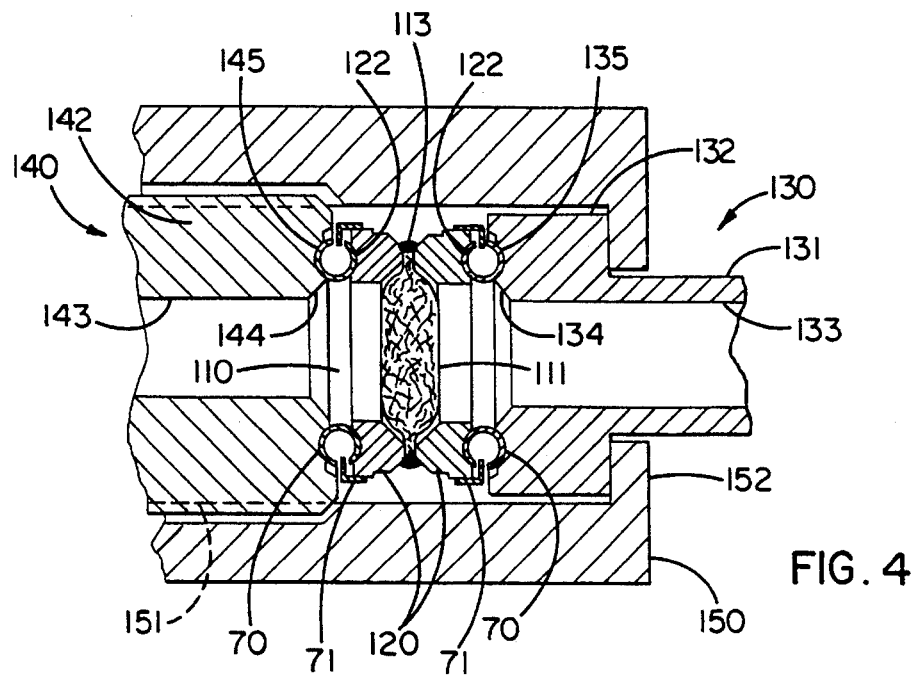
FIG. 4 is a longitudinal cross-sectional view of another embodiment of the present invention installed in a different type of tubing connector.
Figure 5:
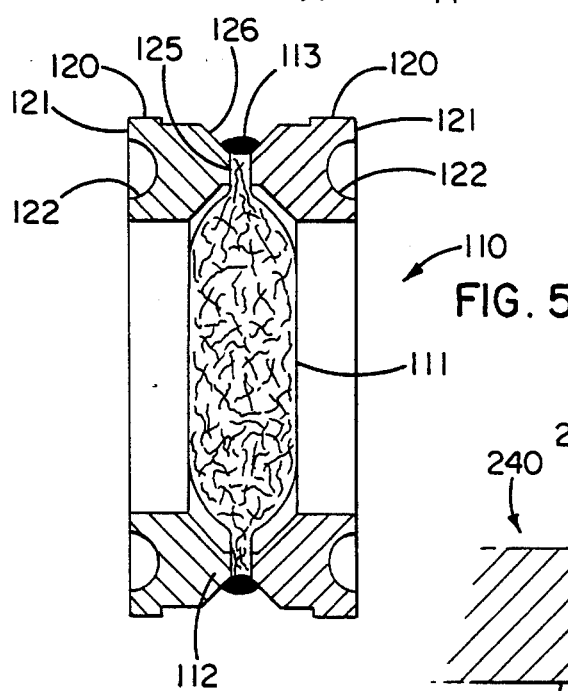
FIG. 5 is an enlarged view of the embodiment of FIG. 4.

FIGS. 4 and 5 illustrate another embodiment of a filter according to the present invention. In FIG. 4, the filter 110 is shown installed within a standard variety of tubing connector, and in FIG. 5, the filter is shown outside the tubing connector. In these figures, elements corresponding to elements in the embodiment of FIG. 1 are identified by reference numerals higher by 100 than in that embodiment.

The tubing connector shown in FIG. 4 is of the type referred to as a Super JSK connector, available from Sankou Kougyou K.K. of Tokyo, Japan. A Super JSK connector is similar in structure to a VCR connector and differs primarily in that it uses sealing rings to form a seal instead of a gasket. The Super JSK connector of FIG. 4 includes first and second sections 130 and 140 held together by a connecting nut 150 which engages with external threads formed on the outside of the second section 140.

The first section 130 comprises a tubular portion 131 to which tubing can be attached and an enlarged head portion 132 integrally formed on one end of the tubular portion 131. A cylindrical bore 133 runs through the center of the first section 130 over its entire length.

The second section 140 of the connector likewise has an unillustrated tubular portion and an enlarged head portion 142 integrally formed on one end of the tubular portion 141. A cylindrical bore 143 is formed through the center of the second section 140 over its entire length. When the first and second sections 130 and 140 are joined together, the two central bores 133 and 143 are coaxially disposed.

The connecting nut 150 fits over the head portions of both sections 130 and 140 and has internal threads 151 which engage with unillustrated external threads formed on the head portion 142 of the second section 140.

Conical chamfered surfaces 134 and 144 corresponding to surfaces 34 and 44 of FIG. 1 are formed on the end surfaces of the head portions 132 and 142 adjoining the bores 133 and 143. Instead of the projections 35 and 45 of a VCR connector, each head portion 132 and 142 has an identical annular recess 35 and 45, respectively, formed in its end surface surrounding the chamfered surfaces 133 and 143 for receiving a sealing member 70. Each annular recess has a roughly semi-circular cross section. The sealing member 70 is typically a conventional spring-loaded C-ring or O-ring, i.e., an annular member with the cross-sectional shape of an 0 or a C and possibly having a coil energizing spring disposed at its center. When a filter according to the present invention is used to filter corrosive gases such as those used in the manufacture of semiconductors, the sealing member 70 is preferably made of a corrosion resistant metal. When a Super JSK connector is used without a filter according to the present invention, a single sealing member 70 is disposed between the opposing head portions 132 and 142 and is sealingly received in the opposing annular recesses 135 and 145.

As shown in FIG. 5, which is an enlarged view of the filter 110 of FIG. 4, the structure of this embodiment is similar to that of the embodiment of FIG. 1, and a description of portions identical in structure will be omitted. A filter element 111 is sandwiched between the inner lateral surfaces of the gaskets 120 and is welded to the gaskets 120 by a weld 113 extending around the entire periphery of the filter element 111 to secure the gaskets 120 to each other and to the filter element 111. Instead of the grooves 22 shown in FIG. 2, an annular recess 122 for receiving one of the sealing members 70 is formed in the outer lateral surface 121 of each gasket 120. These recesses 122 may have the same shape (such as semicircular) as the annular recesses 135 and 145 in the end faces of the connector sections 130 and 140. The distance of each recess 122 from the longitudinal centerline of the gasket 120 matches the distance of the annular recesses 135 and 145 in the connector from the centerline of the connector. Therefore, when the filter 110 is installed in a connector, as shown in FIG. 4, each of the annular recesses 122 opposes one of the annular recesses 135 and 145 in the connector. The integrity of the seal between the sealing members 70 and the recesses 122 is preferably the same as the integrity of the seal between the sealing members 70 and the recesses 135 and 145 of the connector sections.

It is possible to omit the recesses 122 in the gaskets 120 and to make the portions of the outer lateral surfaces 121 which are in sealing contact with the sealing members 70 planar, for example. However, the provision of the recesses 122 in the outer lateral surfaces 121 of the gaskets 120 improves the quality of the seal between the sealing members 70 and the gaskets 120, and also makes it easier to position the sealing members 70 with respect to the gaskets 120.

It is possible to semipermanently mount the sealing members 70 on either the gaskets 120 of the filter 110 or on the end faces of the connector sections 130 and 140 by bonding or welding, for example. However, bonding or welding may distort the sealing members 70 and reduce their sealing ability, as well as potentially introducing sources of contamination into the tubing connector, and so is generally undesirable.

Therefore, the sealing members 70 may be loosely mounted on the gaskets 120 without any restraints when the filter 110 is not installed in a connector. Alternatively, to prevent the sealing members 70 from falling off when the filter 110 is being installed or removed, annular retainer clips 71 which mechanically support the sealing members 70 in the recesses 122 may be mounted on the gaskets 120, as shown in FIG. 4, or on the connector sections 130 and 140. Retaining clips for use with sealing members of tubing connectors are well known to those skilled in the art.

The combination of two sealing member 70 and the filter 110 is thicker than a single sealing member 70 which is normally used to form a seal in a Super JSK connector, so it may be desirable for the connecting nut 150 to be longer than that normally used in order to compensate for the increased thickness. However, the structure of the connector can be otherwise identical to that of an off-the-shelf Super JSK connector.

Figure 6:
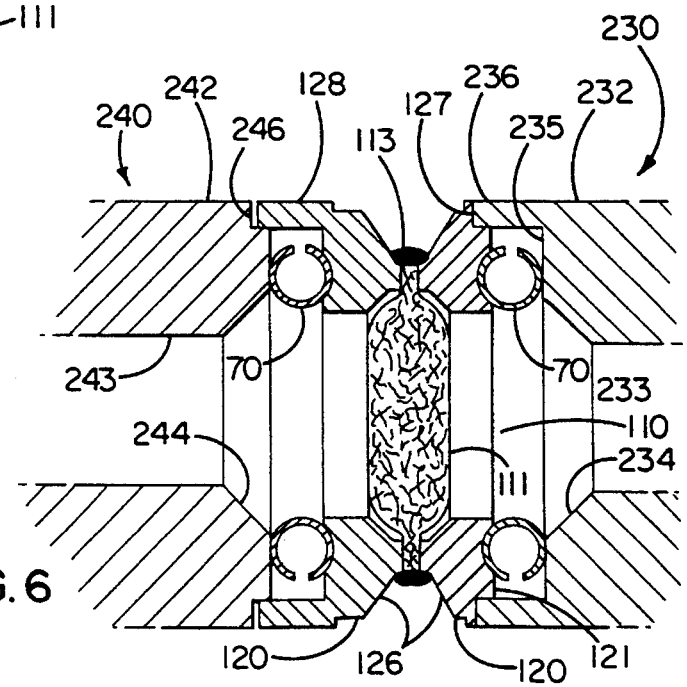
FIG. 6 is a longitudinal cross-sectional view of the embodiment of FIG. 4 installed in another type of tubing connector.

A filter according to the present invention can also be installed in a standard tubing connector of the type referred to as an MCG connector, available from Toyoko Kagaku Co. Ltd. of Japan. FIG. 6 illustrates a filter 110 similar to the filter of FIG. 5 installed in a connector of this type. The overall structure of an MCG connector is similar to that of a Super JSK connector, and portions of the MCG connector in FIG. 6 corresponding to the Super JSK connector in FIG. 4 are indicated by reference numerals 100 higher than the references numerals of corresponding portions in FIG. 4.

In contrast to a Super JSK connector in which annular recesses 135 and 145 are formed in the opposing end surfaces of the first and second sections 130 and 140, in an MCG connector, the opposing ends of head portions 232 and 242 have opposing flat surfaces 235 and 245, respectively, for sealing contact with sealing member 70. Normally, a single sealing member 70 is disposed between the two flat surfaces 235 and 245. In the embodiment of FIG. 6, a single sealing member 70 is replaced by two sealing members 70 and the filter 110 of FIG. 5 disposed between them. Each sealing member 70 is in sealing contact with one of the flat surfaces 235 and 245 of the connector and with one of the annular recesses 122 in the gaskets 120 of the filter 110.

An MCG connector is equipped with an unillustrated connecting nut which can be tightened to urge the two sections 230 and 240 of the connector towards one another. The connecting nut is preferably longer than that normally used to compensate for the greater thickness of the filter 110 and the two sealing members 70 compared to a single sealing member 70 which is normally used in an MCG connector. One section 230 of the illustrated MCG connector has an axially extending flange 236 formed on its end surface and shaped to contact a step 246 formed on the end surface of the other section 240 of the connector. When the connector sections 230 and 240 are sealed using a single sealing member 70 disposed between sealing surfaces 235 and 245, the flange 236 abuts against the step 246 and prevents the sealing member 70 from being overcompressed. As the filter 110 of FIG. 6 has larger axial dimensions than a single sealing member 70, the flange 236 and the step 246 may not be able to contact each other when the sealing members 70 are compressed by a suitable amount.

Therefore, the filter 110 may be equipped with one or more stopper members to prevent overcompression of the sealing members 70. For example, in FIG. 6, one of the gaskets 120 of the filter 110 has a step 127 formed on its outer lateral surface and extending around its periphery for engagement with flange 236 of connector section 230, while the other gasket 120 has a flange 128 formed on its outer lateral surface and extending around its periphery for engagement with the step 246 of connector section 240.

A filter according to the present invention has been described above as used with standard varieties of tubing connectors. However, the present invention is not limited to use with these particular connectors and can be employed with any type of connector that permits sealing contact between the filter and the connector. Furthermore, it is also possible to employ the filter without any tubing connector. For example, the outer faces of the gaskets of the filter can be directly welded to the ends of tubing for carrying the fluid to be filtered.

What is claimed is:

1. An in-line filter comprising:

first and second gaskets;

a filter element sandwiched between the gaskets; and a sealing portion disposed between the gaskets and forming a seal around a periphery of the filter element.

2. A filter according to claim 1 wherein the gaskets are secured to each other.

3. A filter according to claim 1 wherein the sealing portion extends between the gaskets.

4. A filter according to claim 1 wherein the gaskets have a larger outer diameter than the filter element.

5. A filter according to claim 1 wherein the gaskets comprise a non-elastomeric material.

6. A filter according to claim 1 wherein the gaskets are metallic.

7. A filter according to claim 6 wherein the sealing portion comprises a weld formed between the gaskets.

8. A filter according to claim 6 wherein the filter element comprises a metallic filter medium.

9. A filter according to claim 8 wherein the sealing portion comprises a weld between the filter element and the gaskets.

10. A filter according to claim 1 wherein each of the gaskets is annular.

11. A filter according to claim 1 wherein each of the gaskets has a lateral surface with a chamfered surface for sealingly engaging a sealing surface of a section of a tubing connector.

12. A filter according to claim 1 wherein each of the gaskets has a lateral surface having an annular recess for receiving a sealing ring.

13. A filter according to claim 12 wherein each annular recess has a semicircular cross-section.

14. A filter according to claim 1 wherein the filter element comprises a central portion surrounded by the periphery, and the periphery is compressed with respect to the central portion.

15. A filter according to claim 1 wherein the gaskets have opposing inner lateral surfaces and outer lateral surfaces facing in opposite directions, and the filter element is disposed entirely between imaginary planes contacting the outer lateral surfaces.

16. An in-line filter comprising:

first and second metal gaskets welded to each other; and a metal filter element sandwiched between the gaskets.

17. A tubing connector assembly comprising:

a tubing connector including a first connector section having a first hollow bore and a first end surface, and a second connector section having a second hollow bore coaxial and a second end surface opposing the first end surface; and a filter disposed within the tubing connector between the first and second connector sections and detachably sealed to the connector sections, the filter comprising first and second gaskets, a filter element sandwiched between the gaskets, and a sealing portion disposed between the gaskets and forming a seal around a periphery of the filter element.

18. An assembly according to claim 17 wherein each gasket has an outer lateral surface sealingly contacting the end surfaces of one of the connector sections.

19. An assembly according to claim 18 wherein each of the outer lateral surfaces has a chamfered surface sealingly engaging the end surface of one of the connector sections.

20. An assembly according to claim 17 wherein each gasket has an outer lateral surface, further comprising sealing members each sealingly contacting one of the lateral surfaces and the end surface of one of the connector sections.

21. An assembly according to claim 20 wherein each outer lateral surface includes an annular recess for receiving one of the sealing members.

22. An assembly according to claim 21 wherein the sealing members comprises rings having a hollow transverse cross section.

* * * * *